US009250554B2

(12) United States Patent
Tashiro et al.

(10) Patent No.: US 9,250,554 B2
(45) Date of Patent: Feb. 2, 2016

(54) IMAGE PROCESSING APPARATUS, IMAGE PROCESSING METHOD, AND NON-TRANSITORY COMPUTER READABLE MEDIUM

(71) Applicant: FUJI XEROX CO., LTD., Tokyo (JP)

(72) Inventors: Yosuke Tashiro, Kanagawa (JP); Masahiko Kubo, Kanagawa (JP); Jun Koyatsu, Kanagawa (JP); Keiichi Okada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/197,874

(22) Filed: Mar. 5, 2014

(65) Prior Publication Data

US 2015/0029518 A1 Jan. 29, 2015

(30) Foreign Application Priority Data

Jul. 24, 2013 (JP) ................................ 2013-153516

(51) Int. Cl.
*G06F 3/12* (2006.01)
*G03G 15/01* (2006.01)
*G03G 15/00* (2006.01)
*H04N 1/60* (2006.01)

(52) U.S. Cl.
CPC ............ *G03G 15/01* (2013.01); *G03G 15/5025* (2013.01)

(58) Field of Classification Search
USPC .......................... 358/1.9, 3.06, 518, 504, 534
See application file for complete search history.

(56) References Cited

U.S. PATENT DOCUMENTS 7,477,419 B2 * 1/2009 Bolognino ............ H04N 1/603 358/1.9
2010/0288144 A1 * 11/2010 Suda ...................... B41F 23/02 101/217

FOREIGN PATENT DOCUMENTS

JP A-7-114241 5/1995

* cited by examiner

*Primary Examiner* — Quang N Vo
(74) *Attorney, Agent, or Firm* — Oliff PLC

(57) ABSTRACT

An image processing apparatus includes a calculation unit and a white layer density determination unit. The calculation unit calculates, based on multiple color component signals to be used for image formation, an image layer halftone percentage of an image layer to be formed on a recording medium. The white layer density determination unit determines, based on the image layer halftone percentage, a white layer halftone percentage of a white layer to be formed as an underlying layer of the image layer on the recording medium.

8 Claims, 7 Drawing Sheets

10

IMAGE PROCESSING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-153516 filed Jul. 24, 2013.

BACKGROUND (i) Technical Field

The present invention relates to an image processing apparatus, an image processing method, and a non-transitory computer readable medium.

(ii) Related Art

Some of image forming apparatuses that form an image using colorants such as toners or inks use a white colorant such as white (W) toner or white ink. For example, when an image is formed on a recording medium such as a transparent medium or a colored paper with low reflectance, an underlying layer of the white toner is formed under a color layer (image layer) of color toners of cyan (C), magenta (M), yellow (Y), black (K), and so forth. The white underlying layer provided under the color layer prevents or reduces a decrease in color reproducibility.

SUMMARY

According to an aspect of the invention, there is provided an image processing apparatus including a calculation unit and a white layer density determination unit. The calculation unit calculates, based on multiple color component signals to be used for image formation, an image layer halftone percentage of an image layer to be formed on a recording medium. The white layer density determination unit determines, based on the image layer halftone percentage, a white layer halftone percentage of a white layer to be formed as an underlying layer of the image layer on the recording medium.

BRIEF DESCRIPTION OF THE DRAWINGS

An exemplary embodiment of the present invention will be described in detail based on the following figures, wherein.

DETAILED DESCRIPTION

Figure 1:
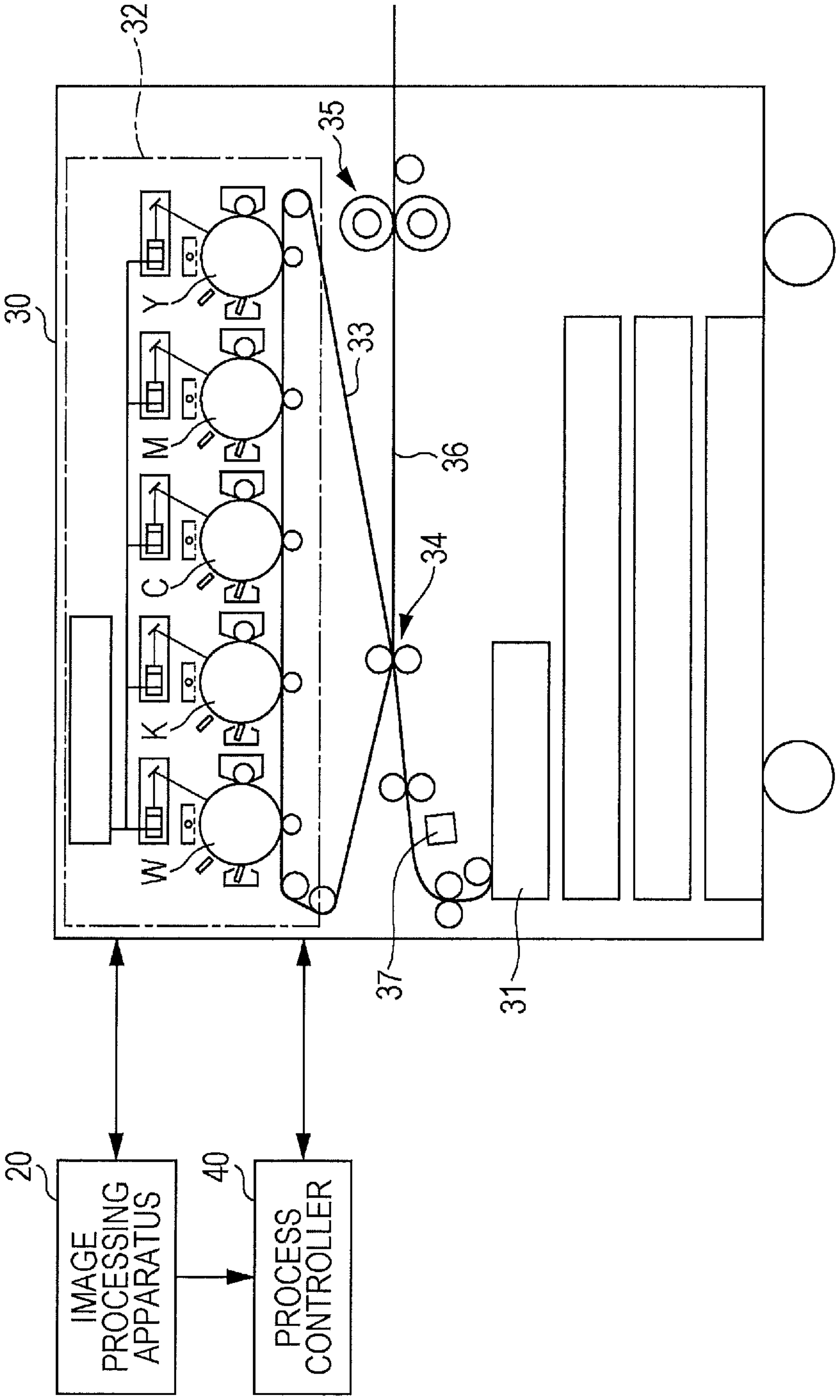
FIG. 1 illustrates an example of an image forming system according to an exemplary embodiment.

FIG. 1 illustrates an example of an image forming system according to an exemplary embodiment of the present invention. An image forming system 10 includes an image processing apparatus 20, an image forming apparatus 30, and a process controller 40.

The image processing apparatus 20 is configured to receive an image signal, to perform image processing on the received image signal, and to output the resulting image signal to the image forming apparatus 30 and the process controller 40.

The image forming apparatus 30 is configured to form an image based on an image signal on a recording medium, such as a recording sheet, by using multiple colorants. In this exemplary embodiment, toners are used as colorants. Alternatively, inks or the like may be used as colorants. The image forming apparatus 30 is configured to perform an electrophotographic process to form an image on a recording medium by using white (W) toner and toners (color toners) of multiple primary colors other than white. The image forming apparatus 30 is configured to form a white toner layer (white underlying layer) as the bottom layer on a recording medium, and to form a layer of toners of multiple primary colors (color layer serving as an image layer) on the white underlying layer.

In this exemplary embodiment, the image processing apparatus 20 is configured to change an amount of white toner to be used by the image forming apparatus 30 to form the white underlying layer on a recording medium, in accordance with an amount of color toners to be used to form the color layer on the white underlying layer. In the case where an image is formed on a recording medium with low reflectance such as colored paper, the white underlying layer provided under the color layer prevents or reduces a decrease in color reproducibility. However, the white underlying layer possibly damages the texture of the recording medium because it covers and hides the surface of the recording medium. Accordingly, in this exemplary embodiment, in the case where a recording medium with low reflectance is used, the image processing apparatus 20 limits the amount of white toner to be used to form the white underlying layer so that the white underlying layer which serves as the foundation of the color layer does not dominantly appear in the resulting image when an amount of color toners to be used to form the color layer is small (or when transparency of the color layer is high). In this way, damaging of the texture of the recording medium to an unnecessary degree is avoided. With this configuration, in the case where an image is formed on a recording medium with low reflectance, a decrease in color reproducibility is prevented or reduced and the texture of the recording medium is utilized.

In this exemplary embodiment, for example, four colors, i.e., cyan (C), magenta (M), yellow (Y), and black (K), are used as the primary colors. Note that the exemplary embodiment is not limited to this example, and five or more colors may be used as the primary colors. For example, colors such as orange (O), violet (V), and green (G) may be included in the primary colors used in this exemplary embodiment. A description will be given below using four colors, i.e., C, M, Y, and K, as the primary colors.

The process controller 40 is configured to control image formation performed by the image forming apparatus 30, so as to cause the image forming apparatus 30 to form an image based on the image signal supplied from the image processing apparatus 20.

The following describes details about individual components of the image forming system 10.

First, the configuration of the image forming apparatus 30 will be described. As illustrated in FIG. 1, the image forming apparatus 30 includes a sheet feeding tray 31, an image forming engine 32, an intermediate transfer belt 33, a second transfer device 34, a fixing device 35, a transportation path 36, and a detector 37.

The sheet feeding tray 31 contains multiple recording media. The recording media contained in the sheet feeding tray 31 are taken out from the sheet feeding tray 31 one by one, and are sequentially transported along the transportation path 36 to a sheet exit via the second transfer device 34 and the fixing device 35.

The image forming engine 32 includes a Y-mechanism configured to form a yellow (Y) toner image on the intermediate transfer belt 33, an M-mechanism configured to form a magenta (M) toner image on the intermediate transfer belt 33, a C-mechanism configured to form a cyan (C) toner image on the intermediate transfer belt 33, a K-mechanism configured to form a black (K) toner image on the intermediate transfer belt 33, and a W-mechanism configured to form a white (W) toner image on the intermediate transfer belt 33. In an example, these mechanisms are arranged sequentially from the upstream side of the intermediate transfer belt 33 in the order of the Y-mechanism, the M-mechanism, the C-mechanism, the K-mechanism, and the W-mechanism. The image forming engine 32 scans and exposes photoconductor drums, which are image carriers, with light in accordance with image signals of the C, M, Y, K, and W colors to form electrostatic latent images on the photoconductor drums. The image forming engine 32 then develops the electrostatic latent images using toners of the C, M, Y, K, and W colors to form toner images of the individual colors on the photoconductor drums. The image forming engine 32 transfers the toner images formed on the individual photoconductor drums onto the intermediate transfer belt 33 so that the toner images are superimposed with one another.

The second transfer device 34 transfers the toner images of the individual colors formed on the intermediate transfer belt 33 so as to be superimposed with one another from the intermediate transfer belt 33 onto a recording medium. The fixing device 35 fixes the toner images transferred on the recording medium onto the recording medium by heat generated by a heating roller and pressure applied by a pressure roller.

The detector 37 is configured to radiate detection light to the surface of a recording medium, to detect an amount of reflected light, and to output a signal representing the detected amount of reflected light to the image processing apparatus 20. The detector 37 may be configured to detect an amount of light that has transmitted through a recording medium, and to output a signal representing the detected amount of transmitted light to the image processing apparatus 20.

Now, an operation of the image forming apparatus 30 will be described. First, toner images of the individual colors are transferred onto the intermediate transfer belt 33 so as to be superimposed with one another in the order of Y, M, C, K, and W by the image forming engine 32. Then, the Y, M, C, K, and W toner images are transferred from the intermediate transfer belt 33 onto a recording medium by the second transfer device 34. In this way, the white underlying layer serving as the bottom layer is formed on the recording medium, and the color layer is formed on the white underlying layer. The toner images transferred on the recording medium are then fixed by the fixing device 35. Alternatively, the transfer and fixing process may be performed multiple times so as to separately form the white underlying layer and the color layer on a recording medium. For example, the image forming apparatus 30 may form the white underlying layer on a recording medium through a first transfer and fixing process, and then form the color layer on the white underlying layer through a second transfer and fixing process.

Figure 2:
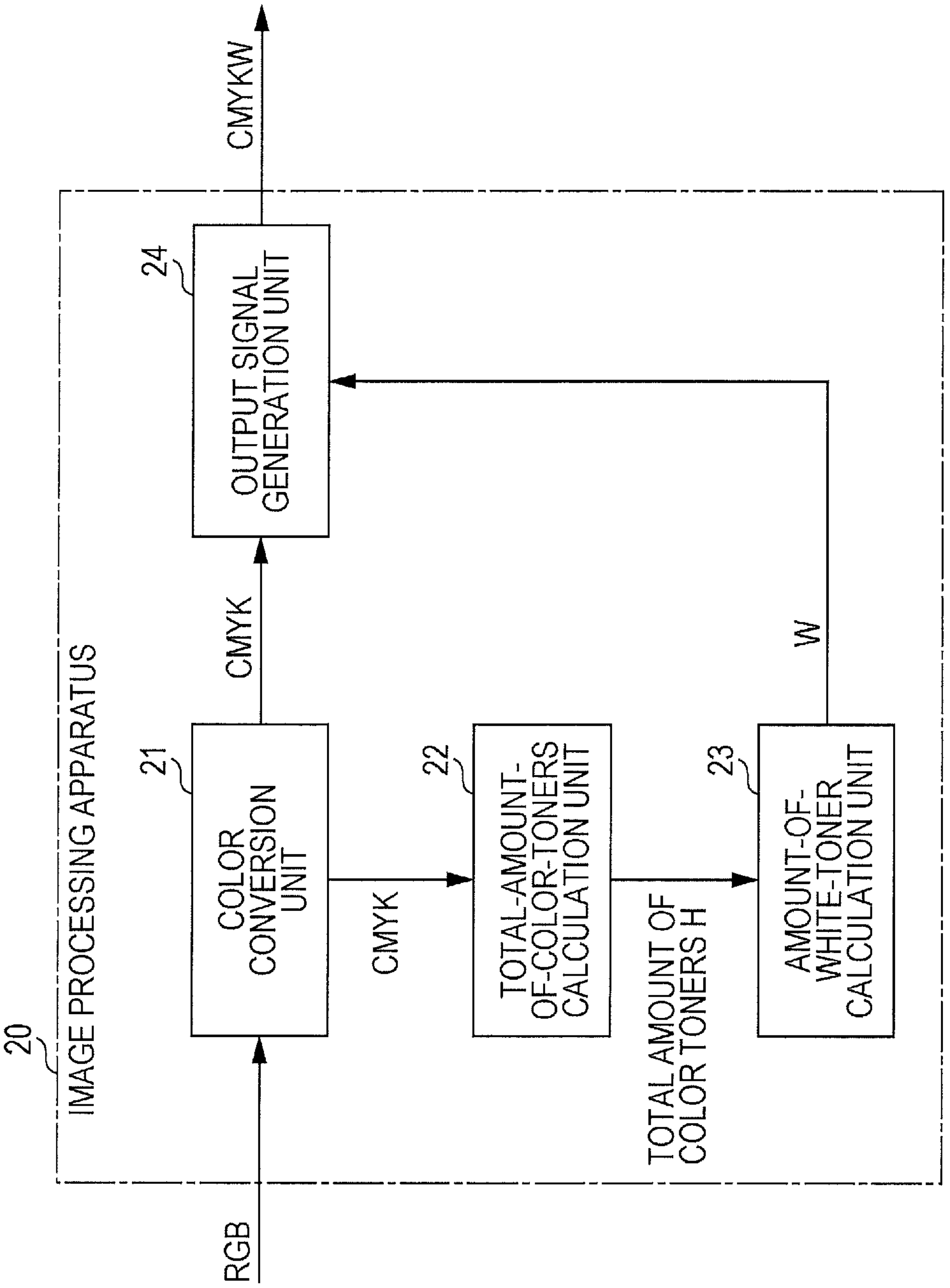
FIG. 2 is a block diagram illustrating an example of an image processing apparatus according to the exemplary embodiment.

Referring next to FIG. 2, the configuration of the image processing apparatus 20 will be described. The image processing apparatus 20 includes a color conversion unit 21, a total-amount-of-color-toners calculation unit 22, an amount-of-white-toner calculation unit 23, and an output signal generation unit 24.

The color conversion unit 21 functions as a color management system (CMS). The color conversion unit 21 is configured to receive an image signal to be printed, and to convert the image signal into a signal of a device-dependent color space which is a color space dependent on the image forming apparatus 30. For example, the color conversion unit 21 receives an image signal (R, G, and B color component signals) represented by a combination of red (R), green (G), and blue (B) or an image signal (C, M, Y, and K color component signals) represented by a combination of cyan (C), magenta (M), yellow (Y), and black (K). For example, when the device-dependent color space is defined by four colors of C, M, Y, and K, the color conversion unit 21 converts the image signal into a signal of the CMYK color space (C, M, Y, and K color component signals). For example, when the input image signal is represented by R, G, and B color component signals, the color conversion unit 21 applies a multi-dimensional lookup table or the like to these R, G, and B color component signals to convert the R, G, and B color component signals into C, M, Y, and K color component signals. The color conversion unit 21 then outputs the resulting C, M, Y, K color component signals to the total-amount-of-color-toners calculation unit 22 and the output signal generation unit 24.

The total-amount-of-color-toners calculation unit 22 is configured to calculate the total amount of color toners H ($H=C+M+Y+K$), which is the total sum of the C, M, Y, and K color component signals output by the color conversion unit 21, and to output a signal representing the total amount of color toners H to the amount-of-white-toner calculation unit 23. For example, suppose that the maximum values of C, M, Y, and K toner outputs (halftone percentages) are each set to be 100%. In this case, the total amount of color toners H ranges from 0% to 400%. For example, the total-amount-of-color-toners calculation unit 22 calculates, for each pixel, the total-amount-of-color-toners H, and outputs a signal representing the total amount of color toners H for the pixel to the amount-of-white-toner calculation unit 23. Note that the total amount of color toners H corresponds to an example of an image layer halftone percentage.

The amount-of-white-toner calculation unit 23 is configured to calculate an amount of white toner, based on the property of the recording medium and the total amount of color toners H, and to output a W color component signal representing the calculated amount of white toner to the output signal generation unit 24. For example, suppose that the maximum value of toner output (halftone percentage) of white toner is set to be 100%. In this case, the amount of white toner ranges from 0% to 100%. For example, the amount-of-white-toner calculation unit 23 calculates, for each pixel, an amount of white toner, and outputs a W color component signal representing the amount of white toner for the pixel to the output signal generation unit 24. Alternatively, the amount-of-white-toner calculation unit 23 may calculate the amount of white toner based on the type of an object, such as a letter or a photo, represented by the image signal. Note that the amount of white toner corresponds to an example of a white layer halftone percentage.

In this exemplary embodiment, examples of the property of the recording medium include reflectance, transmittance, and color of the recording medium. For example, the amount-of-white-toner calculation unit 23 receives a signal representing the amount of reflected light from the detector 37 illustrated in FIG. 1 and detects the reflectance of the recording medium based on the received signal. Alternatively, the amount-of-white-toner calculation unit 23 may receive a signal representing the amount of transmitted light from the detector 37, and detect transmittance of the recording medium based on the received signal. Alternatively, the user may specify the property of the recording medium, such as the reflectance, transmittance, or color, by using a user interface (not illustrated). Alternatively, the user may specify the property of the recording medium, such as the reflectance, transmittance, or color, by specifying a specific one of the sheet feeding trays 31. For example, the amount-of-white-toner calculation unit 23 may detect the property of recording media contained in the sheet feeding tray 31 specified by the user, based on the correspondence between identification information of the sheet feeding tray 31 and the property of the recording media contained in the sheet feeding tray 31.

The output signal generation unit 24 outputs color component signals resulting from color conversion to the image forming apparatus 30 and the process controller 40. For example, in the case where white toner is used, the output signal generation unit 24 generates an output signal (C, M, Y, K, and W color component signals) including the C, M, Y, and K color component signals output from the color conversion unit 21 and the W color component signal output from the amount-of-white-toner calculation unit 23, and outputs the C, M, Y, K, and W color component signals to the image forming apparatus 30 and the process controller 40. On the other hand, in the case where white toner is not used, the output signal generation unit 24 outputs the C, M, Y, and K color component signals output from the color conversion unit 21 to the image forming apparatus 30 and the process controller 40.

Figure 3:
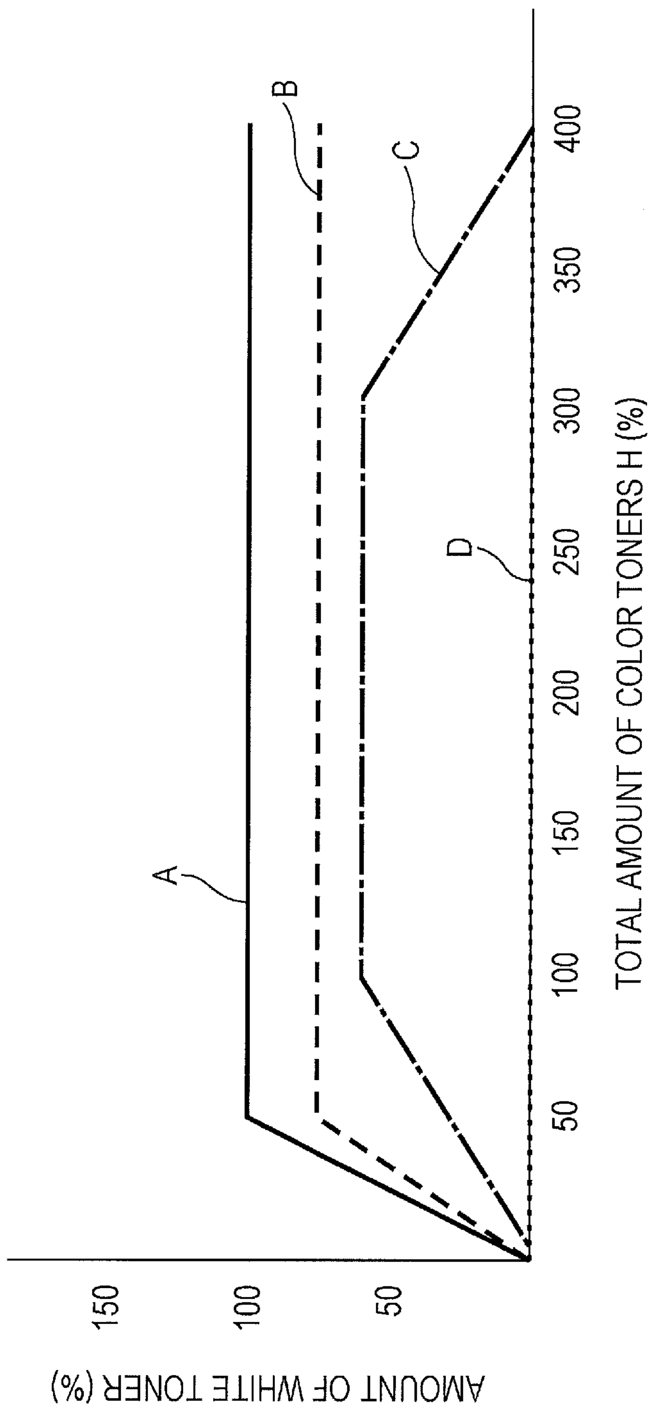
FIG. 3 is a graph illustrating a relationship between a total amount of color toners and an amount of white toner.

Referring next to FIG. 3, a process performed by the amount-of-white-toner calculation unit 23 will be described. The case of determining an amount of white toner based on the reflectance of the recording medium will be described by way of example. Referring to FIG. 3, the horizontal axis represents the total amount of color toners H (%), whereas the vertical axis represents an amount of white toner (%).

If the reflectance of the recording medium is lower than a predetermined threshold, the amount-of-white-toner calculation unit 23 determines, for each pixel, an amount of white toner based on a function A illustrated in FIG. 3, and outputs a W color component signal representing the amount of white toner to the output signal generation unit 24. The threshold is, for example, 70%. Specifically, when the total amount of color toners H is smaller than a toner threshold (for example, H<50%), the amount-of-white-toner calculation unit 23 decreases the amount of white toner as the total amount of color toners H decreases so that the amount of white toner becomes 0% when the total amount of color toners H is 0%. If the total amount of color toners H is larger than or equal to the toner threshold (for example, H≥50%), the amount-of-white-toner calculation unit 23 sets the amount of white toner to be constant (for example, 100% which is the upper limit value of the amount of white toner). A recording medium having a reflectance lower than the threshold corresponds to a recoding medium with low reflectance. Thus, the use of white toner prevents or reduces a decrease in color reproducibility. On the other hand, in an environment where the total amount of color toners H is small (for example, H<50%), the white underlying layer functions too much and undesirably dominantly appears in the resulting image if the amount of white toner is not limited. Accordingly, the amount-of-white-toner calculation unit 23 limits the amount of white toner (used to form the white underlying layer) so that the white underlying layer which lies under the color layer does not dominantly appear in the resulting image. In contrast, in an environment where the total amount of color toners H is large (for example, H≥50%), the white underlying layer hardly dominantly appears in the resulting image. Accordingly, the amount of white toner is increased to a certain value (for example, the upper limit value) so as to prevent or reduce a decrease in color reproducibility by the white toner. For example, a black sheet or transparent recording medium corresponds to a recording medium with low reflectance. When a black sheet or transparent recording medium is specified by the user, the amount-of-white-toner calculation unit 23 may determine the amount of white toner based on the function A.

If the reflectance of the recording medium is higher than or equal to the threshold, the amount-of-white-toner calculation unit 23 outputs the W color component signal representing the amount of white toner of 0% to the output signal generation unit 24 based on a function D illustrated in FIG. 3 regardless of the total amount of color toners H. A recording medium having a reflectance higher than or equal to the threshold is a recording medium with high reflectance, and a decrease in color reproducibility is suppressed even if the white toner is not used. Accordingly, the amount-of-white-toner calculation unit 23 outputs a signal representing the amount of white toner of 0%. For example, a white sheet corresponds to a recording medium with high reflectance. When a white sheet or a recording medium with high reflectance is specified by the user, the amount-of-white-toner calculation unit 23 may determine the amount of white toner based on the function D.

Alternatively, the amount-of-white-toner calculation unit 23 may determine the amount of white toner using different functions in accordance with the reflectance of the recording medium. For example, a first threshold (for example, 70%) and a second threshold (for example, 50%) lower than the first threshold are preset in the amount-of-white-toner calculation unit 23. If the reflectance of the recording medium is higher than or equal to the first threshold, the amount-of-white-toner calculation unit 23 determines, for each pixel, the amount of white toner based on the function D. If the reflectance of the recording medium is lower than the second threshold, the amount-of-white-toner calculation unit 23 determines, for each pixel, the amount of white toner based on the function A. If the reflectance of the recording medium is lower than the first threshold and higher than or equal to the second threshold, the amount-of-white-toner calculation unit 23 determines, for each pixel, the amount of white toner based on a function B which gives a smaller amount of white toner than the function A. Like the function A, according to this function B, in the case where the total amount of color toners H is smaller than the toner threshold (for example, H<50%), the amount of white toner decreases as the total amount of color toners H decreases so that the amount of white toner becomes 0% when the total amount of color toners is 0%. In the case where the total amount of color toners H is larger than or equal to the toner threshold (for example, H≥50%), the amount of white toner is constant (for example, 70%, which is the upper limit value smaller than the upper limit value of the function A). Even if the total amount of color toners H is the same, the amount of white toner specified by the function B is smaller than that specified by the function A.

In the case where a recording medium having a high reflectance, for example, a reflectance higher than or equal to the first threshold, is used, a decrease in color reproducibility is prevented or reduced even if the white toner is not used. Thus, the amount-of-white-toner calculation unit 23 outputs a signal representing the amount of white toner of 0%, based on the function D. On the other hand, in the case where a recording medium having a low reflectance, for example, a reflectance lower than the second threshold, is used, color reproducibility decreases unless the white toner is used. Thus, the amount-of-white-toner calculation unit 23 determines the amount of white toner based on the function A. In the case where a recording medium having an intermediate reflectance, for example, a reflectance lower than the first threshold and higher than or equal to the second threshold is used, color reproducibility decreases if the white toner is not used but the decrease in color reproducibility is prevented or reduced by using a smaller amount of white toner than that used for the recording medium with low reflectance. Accordingly, the amount-of-white-toner calculation unit 23 determines the amount of white toner based on the function B which gives a smaller amount of white toner than the function A for the same total amount of color toners H. In this way, the decrease in color reproducibility is prevented or reduced and the white underlying layer is prevented from functioning too much. As a result, the texture of the recording medium is utilized. For example, a gray sheet corresponds to a recording medium with intermediate reflectance. When a gray sheet is specified by the user, the amount-of-white-toner calculation unit 23 may determine the amount of white toner based on the function B. Alternatively, the amount-of-white-toner calculation unit 23 may set finer ranges of reflectance of the recording medium using three or more thresholds, and determine the amount of white toner in accordance with the reflectance.

Alternatively, the amount-of-white-toner calculation unit 23 may determine the amount of white toner using different functions in accordance with the type of an object represented by an image signal. Examples of the object include a letter, a graphic, and a photo.

For example, in an environment in which the reflectance of the recording medium is lower than the threshold (for example, 70%), if the object represented by the image signal is a letter, the amount-of-white-toner calculation unit 23 determines the amount of white toner based on the function A. On the other hand, if the object represented by the image signal is a photo or graphic, the amount-of-white-toner calculation unit 23 determines the amount of white toner based on the function B. That is, in the case where the object is a photo or graphic, the amount-of-white-toner calculation unit 23 limits the amount of white toner compared with the case where the object is a letter. By limiting the amount of white toner in the case where the object is a photo or graphic compared with the case where the object is a letter in this way, an amount of decreased color toners decreases when the total amount of C, M, Y, K, and W color toners is limited based on a limit value for the total amount of toners. As a result, a decrease in color reproducibility of a photo or graphic is prevented or reduced. This will be further described in detail.

In the image forming apparatus 30, a limit value is set for the total amount of toners in order to prevent transfer defects such as scattering of toners and fixing defects such as insufficient fixing of toners. The limit value of the total amount of toners is a limit value of the total amount of toners (the amount of all the toners of C, M, Y, K, and W colors) for each pixel, and is set to be, for example, 240% to 300%. Because the limit value of the total amount of toners is set in the image forming apparatus 30 in this way, the amount of color toners is to be reduced as the amount of white toner is increased so that the total amount of all the toners of C, M, Y, K, and W colors does not exceed the limit value of the total amount of toners. However, if the amount of color toners is reduced, color reproducibility decreases due to the reduction. Accordingly, in this exemplary embodiment, in the case where the object is a photo or graphic, the amount of white toner is limited compared with the case where the object is a letter. With this configuration, an amount of reduced color toners decreases in the case where the total amount of toners is limited, and thus a decrease in color reproducibility due to the reduction in the amount of color toners is prevented or reduced. On the other hand, in the case where the object is a letter, color reproducibility achieved by color toners is not prioritized compared with the case where the object is a photo or graphic. Thus, the amount of white toner is not limited and whiteness is increased.

As described above, in the case where the object is a photo, graphic, or the like, and color reproducibility achieved by color toners is prioritized, the amount of white toner is limited compared with the case where the object is a letter and color reproducibility achieved by color toners is not prioritized. In this way, a decrease in color reproducibility due to a decrease in the amount of color toners is prevented or reduced in the case where the total amount of toners is limited.

Alternatively, in the case where the object is a photo or graphic, the amount-of-white-toner calculation unit 23 may determine the amount of white toner based on a function C illustrated in FIG. 3. Specifically, if the total amount of color toners H is smaller than a first toner threshold (for example, $H<100\%$), the amount-of-white-toner calculation unit 23 limits the amount of white toner by a larger amount as the total amount of color toners H becomes smaller. With this configuration, the amount of white toner is limited so that a decrease in color reproducibility is prevented or reduced and the white underlying layer serving as the foundation of the color layer does not dominantly appear in the resulting image. If the total amount of color toners H is larger than or equal to the first toner threshold and is smaller than a second toner threshold (for example, $100\%\leq H<300\%$), the amount-of-white-toner calculation unit 23 sets the amount of white toner to be constant (for example, 60% which is an upper limit value smaller than the upper limit value of the function A). With this configuration, whiteness of a recording medium is improved by the white toner and a decrease in color reproducibility is prevented or reduced. If the total amount of color toners H is larger than or equal to the second toner threshold (for example, $H\geq 300\%$), the amount-of-white-toner calculation unit 23 limits the amount of white toner by a larger amount as the total amount of color toners H becomes larger. By limiting the amount of white toner when the total amount of color toners H is relatively large, an amount of decreased color toners reduces in the case where the total amount of color toners is limited. Thus, a decrease in color reproducibility of a photo or graphic is prevented or reduced.

In the example illustrated in FIG. 3, the total amount of color toners H and the amount of white toner are proportional within a range in which the total amount of color toners H is smaller than 50% for the functions A and B. However, this relationship is merely an example and each of the functions may be a function represented by a curve. The same applies to the function C, and a range representing the proportional relationship between the total amount of color toners H and the amount of white toner may be represented by a curve. The toner thresholds and the upper limit values of the amount of white toner used for the functions A, B, and C are merely examples. Different values may be used for these values, or these values may be changed to any given values by a user. Further, the slopes of the functions A, B, and C may be changed to any given values by a user.

Alternatively, the amount-of-white-toner calculation unit 23 may determine the amount of white toner based on, for example, a preset table as well as the function. Specifically, the amount-of-white-toner calculation unit 23 may determine the amount of white toner by using the property of the recording medium and the total amount of color toners H, based on a correspondence between the property of the recording medium, the total amount of color toners H, and the amount of white toner.

When the white toner is used, the process controller 40 may increase the maximum total amount of toners to be used by the image forming apparatus 30, by an amount equal to an amount of white toner used in addition to the color toners. Then, the process controller 40 changes at least one of a second transfer voltage, a speed of the transfer and fixing process, and a fixing temperature set in the image forming apparatus 30 in accordance with the increase in the maximum total amount of toners. For example, the process controller 40 increases the second transfer voltage of the second transfer device 34, lowers the speed of the transfer and fixing process, or raises the fixing temperature of the fixing device 35 in accordance with the increase in the maximum total amount of toners. With this configuration, occurrence of transfer defects or fixing defects due to the increase in the total amount of toners is prevented or reduced.

Figure 4:
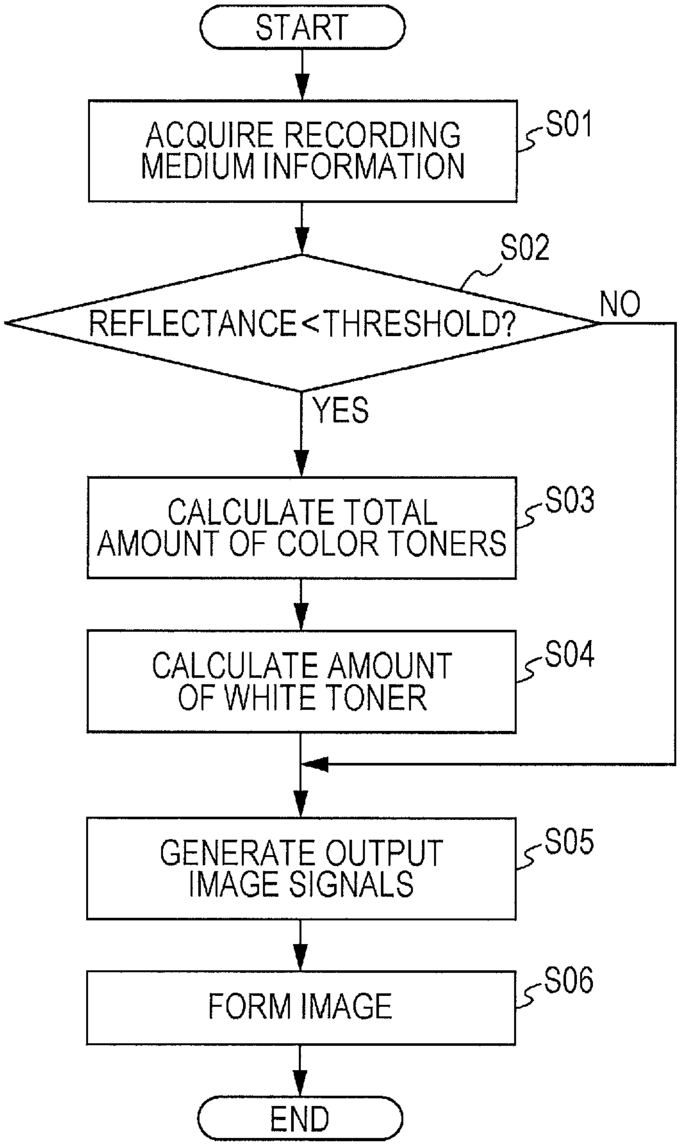
FIG. 4 is a flowchart illustrating an example of a process according to the exemplary embodiment.

Referring next to a flowchart illustrated in FIG. 4, an operation of the image forming system 10 will be described. First, when the image processing apparatus 20 receives an image signal (R, G, and B color component signals), the color conversion unit 21 converts the R, G, and B color component signals into C, M, Y, and K color component signals which are signals of a device-dependent color space. The image processing apparatus 20 also acquires recording medium information representing a property of the recording medium (S01). For example, the image processing apparatus 20 acquires a signal representing reflectance of the recording medium from the image forming apparatus 30. If the reflectance of the recording medium is lower than a threshold (for example, 70%) (YES in S02), the total-amount-of-color-toners calculation unit 22 calculates, for each pixel, the total amount of color toners H which is the sum of the C, M, Y, and K color component signals (S03). Then, based on the reflectance of the recording medium and the total amount of color toners H, the amount-of-white-toner calculation unit 23 calculates, for each pixel, the amount of white toner (S04). For example, the amount-of-white-toner calculation unit 23 determines, for each pixel, the amount of white toner corresponding to the total amount of color toners H, based on the function A illustrated in FIG. 3, and outputs a W color component signal representing the amount of white toner for the pixel to the output signal generation unit 24. The output signal generation unit 24 generates an output signal (C, M, Y, K, and W color component signals) which includes the C, M, Y, and K color component signals and the W color component signal, and outputs the output signal to the image forming apparatus 30 and the process controller 40 (S05). The process controller 40 may increase the maximum total amount of toners to be used by the image forming apparatus 30 by an amount equal to an amount of white toner to be used, and may change a control parameter (for example, the second transfer voltage, the speed of the transfer and fixing process, or the fixing temperature) of the image forming apparatus 30 in accordance with the increase. If the reflectance of the recording medium is higher than or equal to the threshold (for example, 70%) (NO in S02), the output signal generation unit 24 outputs the C, M, Y, and K color component signals as its output signal to the image forming apparatus 30 and the process controller 40. Under control of the process controller 40, the image forming apparatus 30 forms an image on the recording medium based on the C, M, Y, K, and W color component signals or the C, M, Y, and K color component signals supplied from the image processing apparatus 20 (S06). In this way, if the reflectance of the recording medium is lower than the threshold, the white underlying layer is formed on the recording medium using an amount of white toner corresponding to the total amount of color toners H.

Figure 5A:
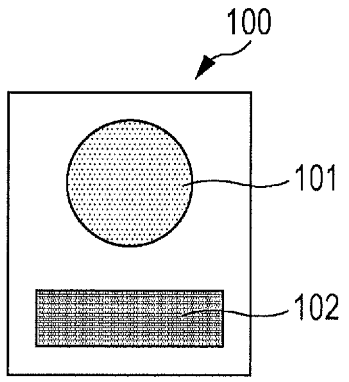
FIGS. 5A to 5D are schematic diagrams illustrating an example of an image structure according to the exemplary embodiment.
Figure 5B:
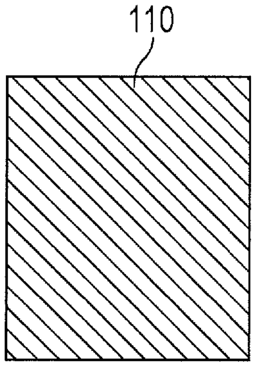
Figure 5C:
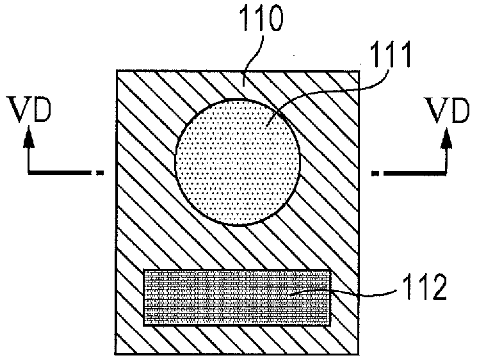
Figure 5D:
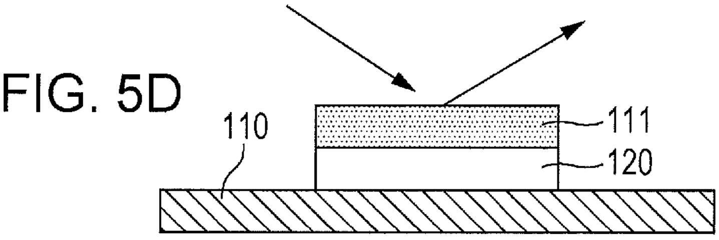

Referring next to a specific example illustrated in FIGS. 5A to 5D, benefits of this exemplary embodiment will be described. FIG. 5A illustrates an example of an image signal 100 to be printed. FIG. 5B illustrates an example of a recording medium 110. The image signal 100 represents, for example, objects 101 and 102. The recording medium 110 is a sheet with low reflectance, such as colored paper. The amount of white toner of each pixel representing the objects 101 and 102 is determined in accordance with the total amount of color toners H of the corresponding pixel of the objects 101 and 102. Also, because the total amount of color toners H of pixels other than the pixels representing the objects 101 and 102 is 0%, the amount of white toner for these pixels is 0%. FIGS. 5C and 5D illustrate the recording medium 110 on which an image based on the image signal 100 is formed. FIG. 5D is a sectional view taken along line VD-VD of FIG. 5C. A color layer 111 represents an image corresponding to the object 101, and a color layer 112 represents an image corresponding to the object 102. The amount of white toner of each pixel representing the object 101 is determined in accordance with the total amount of color toners H of the object 101. Thus, as illustrated in FIG. 5D, a white underlying layer 120 is formed under the color layer 111 by using an amount of white toner corresponding to the total amount of color toners H. A white underlying layer is formed under the color layer 112 by using an amount of white toner corresponding to the total amount of color toners H of the object 102. On the other hand, the amount of white toner of each pixel not representing the objects 101 and 102 is 0%. Thus, as illustrated in FIGS. 5C and 5D, the white underlying layer is not formed at a portion corresponding to these pixels. That is, the white underlying layer is formed only under the color layers 111 and 112 respectively corresponding to the objects 101 and 102, and the white underlying layer is not formed at the other portion.

As described above, because the white underlying layer is unnecessary at a portion corresponding to pixels not representing the object (pixels having the total amount of color toners H equal to 0%), the white underlying layer is not formed at the portion corresponding to these pixels, and the white underlying layer is formed only under the color layer corresponding to the object. In this way, damaging of the texture of the recording medium to an unnecessary degree is avoided. Also, at a portion where the color layer is formed, the white underlying layer is formed using an amount of white toner corresponding to the amount of color toners used to form the color layer so that the white underlying layer does not dominantly appear in the resulting image. In this way, a decrease in color reproducibility is prevented or reduced and damaging of the texture of the recording medium by the white toner is avoided or the degree of the damage is reduced.

Figure 6A:
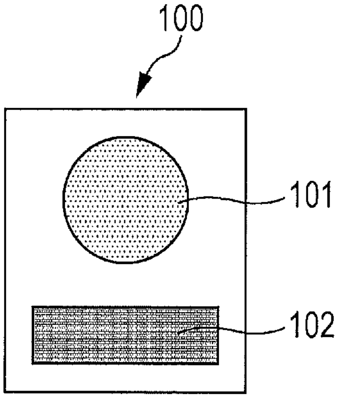
FIGS. 6A to 6C are schematic diagrams illustrating an image structure according to a first reference example.
Figure 6B:
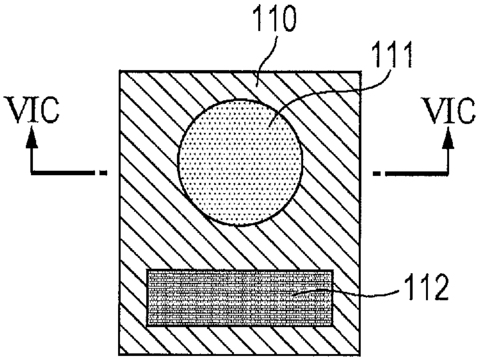
Figure 6C:
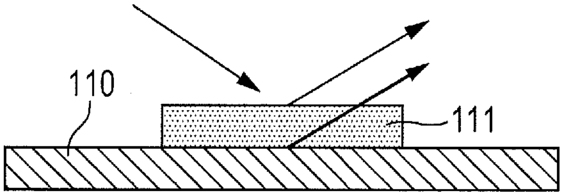

Reference examples will be described next for comparison to this exemplary embodiment. Referring first to FIGS. 6A to 6C, a first reference example will be described. In the first reference example, an image based on the image signal 100 illustrated in FIG. 6A is formed on the recording medium 110 (sheet with low reflectance such as colored paper) without using the white toner as illustrated in FIG. 6B. FIG. 6C is a sectional view taken along line VIC-VIC of FIG. 6B. Because the white toner is not used, the white underlying layer is not formed and the color layer 111 is formed directly on the recording medium 110. Likewise, the color layer 112 is formed directly on the recording medium 110. In the case where the white underlying layer is not formed under the color layer, color reproducibility of the color layers 111 and 112 decreases because of the influence of the color of the recording medium 110 as described above.

Figure 7A:
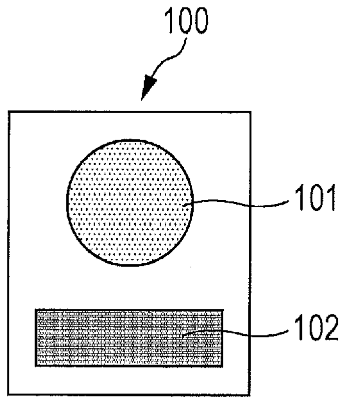
FIGS. 7A to 7C are schematic diagrams illustrating an image structure according to a second reference example.
Figure 7B:
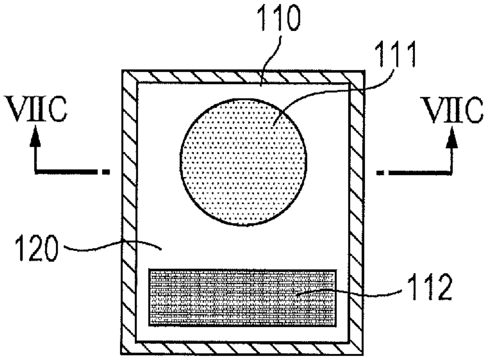
Figure 7C:
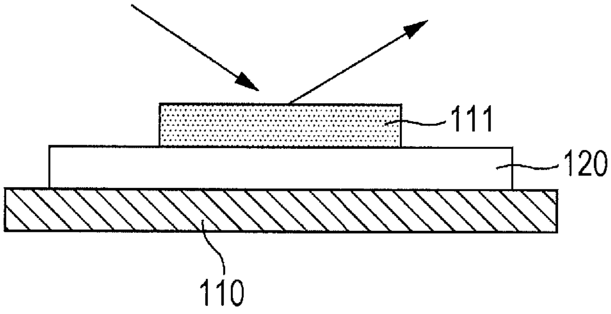

Referring next to FIGS. 7A to 7C, a second reference example will be described. In the second reference example, the white underlying layer 120 is formed all over the recording medium 110 as illustrated in FIG. 7B before an image based on the image signal 100 illustrated in FIG. 7A is formed on the recording medium 110. That is, the image based on the image signal 100 is formed on the white underlying layer 120. FIG. 7C illustrates a sectional view taken along line VIIC-VIIC of FIG. 7B. Because the white underlying layer 120 is formed all over the recording medium 110, the white underlying layer 120 is formed at a portion where the color layers 111 and 112 are not formed. In this case, a decrease in color reproducibility of the color layers 111 and 112 is prevented or reduced. However, because the entire surface of the recording medium 110 is covered with the white underlying layer 120, the texture of the recording medium 110 is damaged. Specifically, because the white underlying layer 120 is formed at a portion where the images of the objects 101 and 102 (color layers 111 and 112) are not formed and the surface of the recording medium 110 is hidden by the white underlying layer 120, the texture of the recording medium 110 is damaged unnecessarily.

In contrast to the first and second reference examples, the amount of white toner is determined for each pixel in accordance with the total amount of color toners H before the white underlying layer is formed on the recording medium in this exemplary embodiment. Thus, the white underlying layer is formed only at a portion where the color layer is formed, by using an amount of white toner corresponding to the total amount of color toners H used to form the color layer. The white underlying layer is not formed at a portion where the color layer is not formed (a portion where the total amount of color toners H is 0%). Thus, the texture of the recording medium is not damaged at that portion. Also, at the portion where the color layer is formed, a decrease in color reproducibility is prevented or reduced and damaging of the texture of the recording medium to an unnecessary degree is avoided or the degree of the damage is reduced because the amount of white toner used to form the white underlying layer is limited so that the white underlying layer does not dominantly appear in the resulting image.

In this exemplary embodiment, the case of using an opaque sheet as a recording medium, forming a white underlying layer on the sheet, and forming a color layer on the white underlying layer has been described. In this case, the resulting image is seen from the color layer side. That is, it is assumed that the image is seen from the front surface (surface having the color layer and the white underlying layer formed thereon) of the sheet. The exemplary embodiment is not limited to this example. For example, a transparent film may be used as the recording medium. In this case, the color layer is formed on the transparent sheet and the white underlying layer is formed on the color layer. The resulting image is seen from the transparent film side. That is, it is assumed that the image is seen from the back surface (surface not having the color layer and the white underlying layer formed thereon) of the sheet. In this case, the white underlying layer functions as an underlying layer of the color layer. Accordingly, in this exemplary embodiment, not only the white underlying layer formed on an opaque sheet but also the white underlying layer formed on the color layer (image layer) formed on a transparent film are also included in an underlying layer of the color layer (image layer) of this exemplary embodiment.

The image processing apparatus 20 is implemented, for example, as a result of cooperation of hardware resources and software. Specifically, the image processing apparatus 20 includes a processor such as a central processing unit (CPU) (not illustrated). The processor reads and executes a program stored in a storage device (not illustrated), whereby the functions of each of the color conversion unit 21, the total-amount-of-color-toners calculation unit 22, the amount-of-white-toner calculation unit 23, and the output signal generation unit 24 are implemented. The program is stored in the storage device via a storage medium such as a Compact Disc (CD) or Digital Versatile Disc (DVD) or a communication medium such as a network.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:

a calculation unit that calculates a total amount of a plurality of colorants to be used for image formation of an image layer to be formed on a recording medium before formation of the image layer as an image layer halftone percentage, the total amount of the plurality of colorants being calculated by a total sum of a plurality of color component signals to be output to an image forming section; and a white layer density determination unit that determines, based on the image layer halftone percentage, a white layer halftone percentage of a white layer to be formed as an underlying layer of the image layer on the recording medium.

2. The image processing apparatus according to claim 1, wherein the white layer density determination unit limits the white layer halftone percentage by a larger amount as the image layer halftone percentage becomes smaller, in a case where the image layer halftone percentage is lower than or equal to a predetermined threshold.

3. The image processing apparatus according to claim 1, wherein the white layer density determination unit determines the white layer halftone percentage, based on a property of the recording medium and the image layer halftone percentage.

4. The image processing apparatus according to claim 1, wherein the white layer density determination unit changes the white layer halftone percentage in accordance with a type of an image represented by the plurality of color component signals.

5. The image processing apparatus according to claim 4, wherein the white layer density determination unit limits the white layer halftone percentage by a larger amount in a case where the image is an image for which color reproducibility is prioritized than in a case where the image is an image for which color reproducibility is not prioritized.

6. The image processing apparatus according to claim 1, wherein the calculation unit calculates, as the image layer halftone percentage, a total amount of colorants of a plurality of color components represented by the plurality of color component signals by adding the plurality of color components together, and the white layer density determination unit determines, based on the calculated total amount, an amount of white colorant serving as the white layer halftone percentage.

7. An image processing method comprising:

calculating a total amount of a plurality of colorants to be used for image formation of an image layer to be formed on a recording medium before formation of the image layer as an image layer halftone percentage, the total amount of the plurality of colorants being calculated by a total sum of a plurality of color component signals to be output to an image forming section; and determining, based on the image layer halftone percentage, a white layer halftone percentage of a white layer to be formed as an underlying layer of the image layer on the recording medium.

8. A non-transitory computer readable medium storing a program causing a computer to execute a process for image processing, the process comprising:

calculating a total amount of a plurality of colorants to be used for image formation of an image layer to be formed on a recording medium before formation of the image layer as an image layer halftone percentage, the total amount of the plurality of colorants being calculated by a total sum of a plurality of color component signals to be output to an image forming section; and determining, based on the image layer halftone percentage, a white layer halftone percentage of a white layer to be formed as an underlying layer of the image layer on the recording medium.

* * * * *